Dec. 29, 1959   C. W. LINDENMEYER   2,919,144
QUICK OPERATING COUPLING
Filed June 27, 1958   3 Sheets-Sheet 1
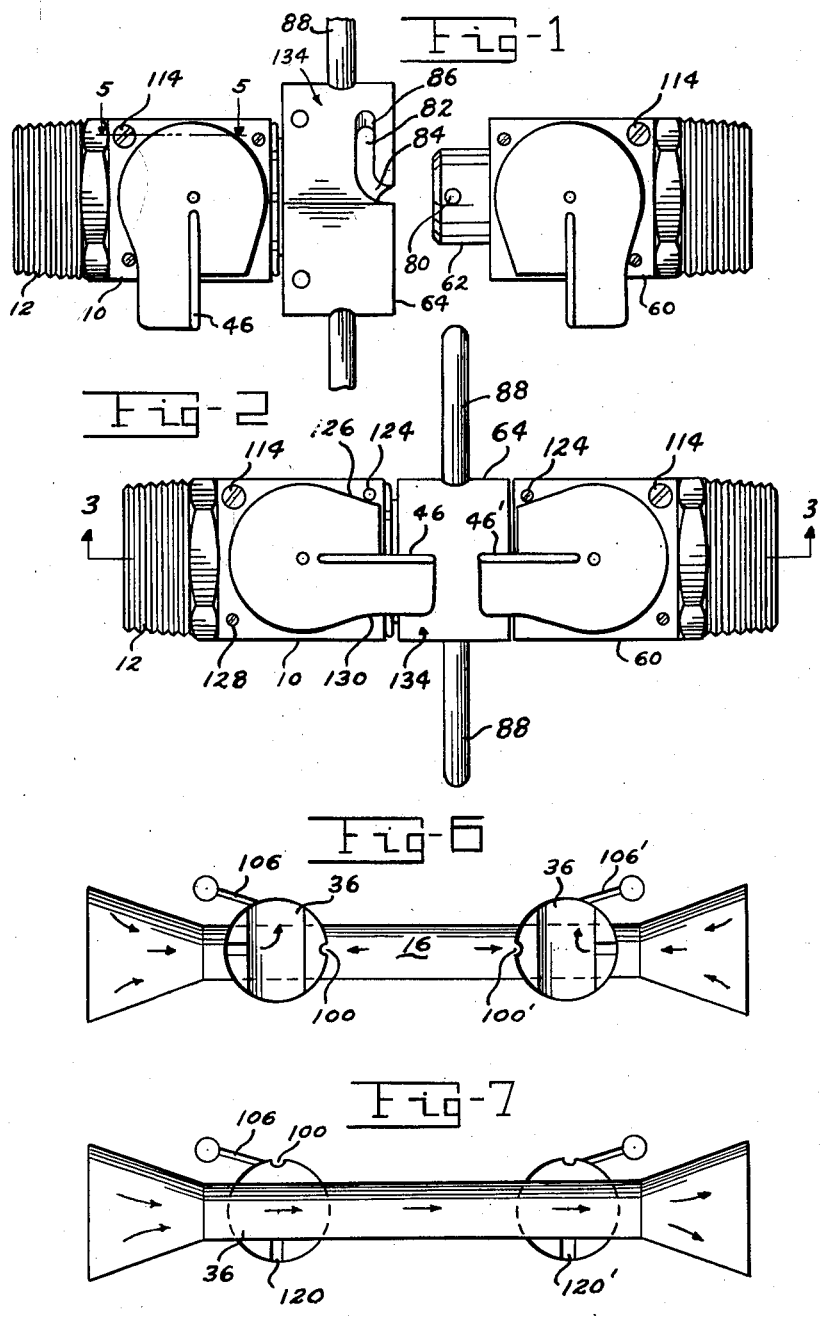
INVENTOR.
CARL W. LINDENMEYER
BY
S.A. Strickland
ATTORNEYS Dec. 29, 1959 C. W. LINDENMEYER 2,919,144
QUICK OPERATING COUPLING
Filed June 27, 1958 3 Sheets-Sheet 2
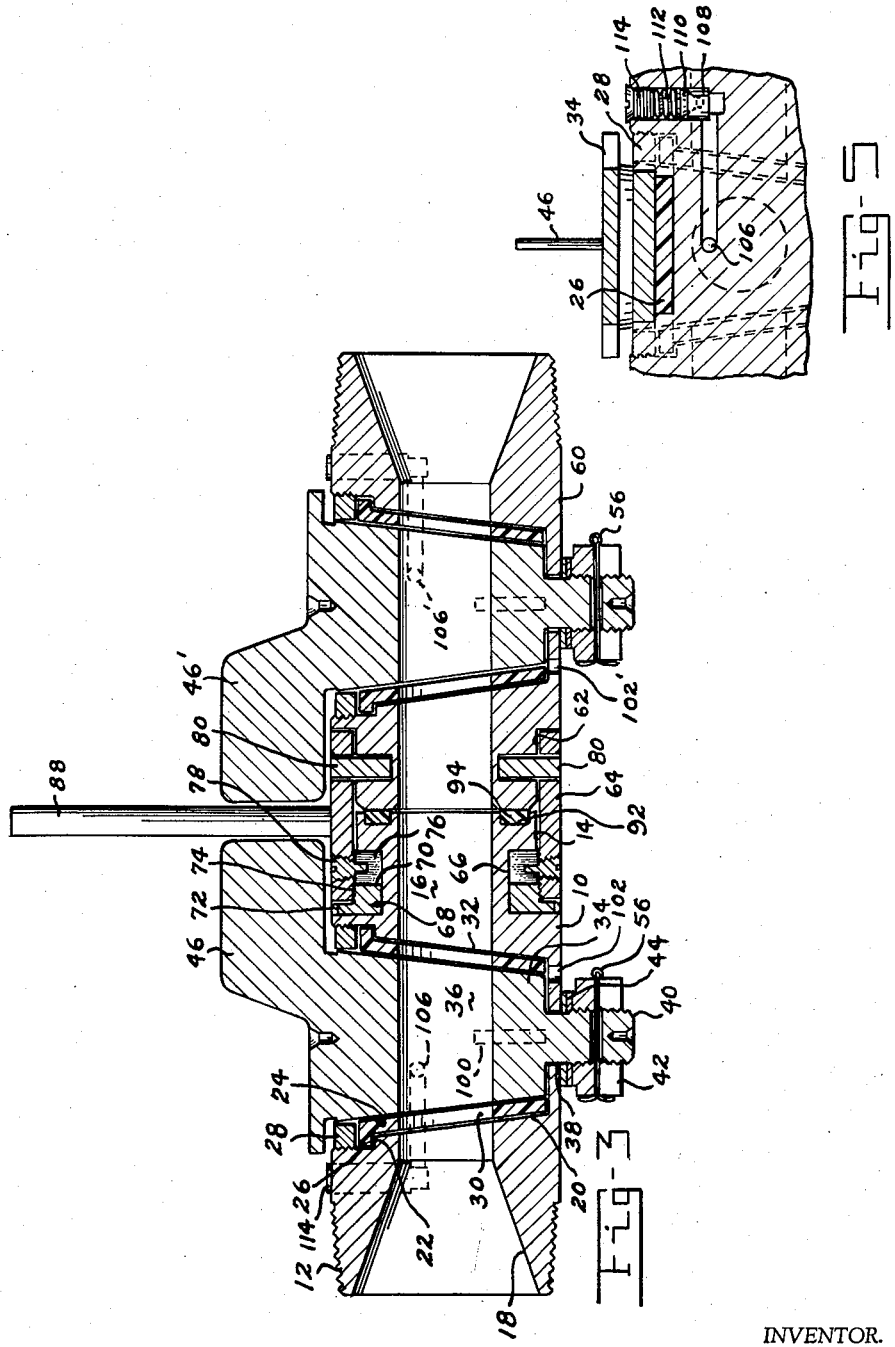
INVENTOR.
CARL W. LINDENMEYER
BY
Wade Koontz
S.A. Stricklett
ATTORNEYS Dec. 29, 1959  C. W. LINDENMEYER  2,919,144
QUICK OPERATING COUPLING
Filed June 27, 1958  3 Sheets-Sheet 3

INVENTOR.
CARL W. LINDENMEYER
BY
Wade Koontz
S.A. Stricklett
ATTORNEYS

United States Patent Office 2,919,144
Patented Dec. 29, 1959

2,919,144

QUICK OPERATING COUPLING

Carl W. Lindenmeyer, Aurora, Ill.

Application June 27, 1958, Serial No. 745,226

3 Claims. (Cl. 284—9)

(Granted under Title 35, U.S. Code (1952), sec. 266)

The invention described herein may be manufactured and used by or for the United States Government for governmental purposes without payment to me of any royalty thereon.

This invention relates to a quick operating coupler and particularly to a valved coupling for safely handling high pressure low temperature fluids.

In the handling of low temperature high pressure fluids such as liquid oxygen and the like considerable difficulty has been encountered because of the shrinkage or distortion of the materials of the conduits because of the low temperature. Also, considerable difficulty has been encountered in the operation of such devices because of sticking or nonlubrication of the working portions of the device. It has been difficult to provide a lubricant which will not be taken up by the liquid being used and which lubricant frequently causes undesirable operation or complete failure of operation of the fluids being transferred. Further, difficulty has been encountered because the low temperature produces freezing or shrinkage of the parts so that leakage occurs in the pressure joints.

Difficulty has also been encountered because of the rapid change of pressure in various portions of the device so that extreme care must be utilized to prevent the expansion of the material producing damaging effects to the coupling or other conduits. The heretofore known conduits or coupling fittings contained obstructions or interruptions on the interior thereof or abrupt changes in diameters of the fluid passages so that cavitational effects occur in the fluids being transferred and this frequently results in evaporation of the material not only producing undesirable pressures but also frequently producing unexpected local low temperatures.

In the construction according to the present invention a pair of valve bodies are each provided with a substantially cylindrical extension which can be abutted together to provide a substantially continuous portion and a coupling sleeve is mounted on one of the extensions and a cooperating part such as a pin on the other extension to lock the extensions in end to end relation. A substantially uniform passage is provided through both of the valve bodies and the extensions so that a substantially uniform noninterrupted passage extends throughout the coupling. The entrance and exit ends of the passage are flared outwardly to prevent abrupt changes in diameter of the passage and thus substantially reduce cavitation throughout the passage. A plug valve is provided in each of the valve bodies with the plug valve aperture movable into and out of register with the valve passage with the valve aperture being of substantially the same diameter as the valve passage to provide a smooth substantially continuous passage.

In order to provide smooth operation of the plug valves a valve liner of a material such as Teflon which provides a nonadhering bearing surface and which is substantially impervious to the fluids being handled is provided in the valve body and secured against rotation therein by suitable anchoring means and a retaining ring preferably threadedly attached to the valve body maintains the liner under proper compression. The valve is preferably of the tapered variety and a thrust spring is provided for firmly maintaining the valve in contact with the valve liner to prevent leakage between the valve and the liner. One face of the valve plug is provided with a longitudinally extending groove which is in registration with that portion of the passage extending into the coupling extensions when the valve is in off or noncommunicating relation with the passage. This groove relieves the pressure in the coupling portion so that the coupling may be uncoupled without the danger of sudden expansion of the contained fluid. Because of the contained fluid in the valve aperture of the plug a relief passage is provided in the valve body in such position that the valve aperture and the relief channel will be in communication when the valve is in off position. To prevent excessive pressures or surges in the lines connected to the valve an opening is provided in the side of the valve plug communicating the valve aperture with the external side of the valve passage so that in the event of unduly high pressures in the supply or output lines the fluid may flow through the openings into the valve aperture and issue through the relief channel. Preferably the relief channel is provided with a poppet type pressure responsive valve so that it will blow off at a predetermined pressure. An interlock is provided between the valves and the coupling to prevent operation of the coupling when the valves are in open condition.

In order to permit adjustment of the coupling to maintain tightness because of wear the coupling sleeve is mounted on a split nut contained in an annular channel on the outer surface of one of the coupling cylinders and in the event of wear this nut may be adjusted to compensate for the wear thus maintaining substantially constant pressure at the coupled faces.

It is, accordingly, an object of the invention to provide an improved coupling.

It is a further object of the invention to provide a coupling which may be adjusted to compensate for shrinkage during use.

It is a further object of the invention to provide a coupling having reduced cavitational effects.

It is still another object of the invention to provide a valve coupling having means for preventing opening of the coupling while the valves are open.

It is a further object of the invention to provide a valve coupling having means for relieving undesirable pressures therein.

It is a further object of the invention to provide a control valve requiring no lubrication.

It is another object of the invention to provide a coupling having a positive break action.

Other objects and advantages of the invention will be apparent from the following detailed description taken in conjunction with the accompanying drawings in which:

Fig. 1 is a top plan view of a coupling according to the invention with the parts in uncoupled relation and the valves in closed or off position;

Fig. 2 is a similar view of the coupling in coupled relation with the valves in open position and locked with a coupling member to prevent opening of the coupling;

Fig. 3 is a vertical elevation taken substantially on a plane indicated by the line 3—3 of Fig. 2 and showing the arrangements of the parts of the coupling;

Fig. 5 is a fragmentary vertical elevation taken substantially on the plane taken between line 5—5 of Fig. 1 and showing the construction of the pressure relief channel for the valve aperture;

Fig. 6 is a flow diagram of the valve coupling in coupled relation with the valves in off or closed position; and Fig. 7 is a similar flow diagram of the valve coupling in coupled relation with the valves in open relation.

Figure 4:
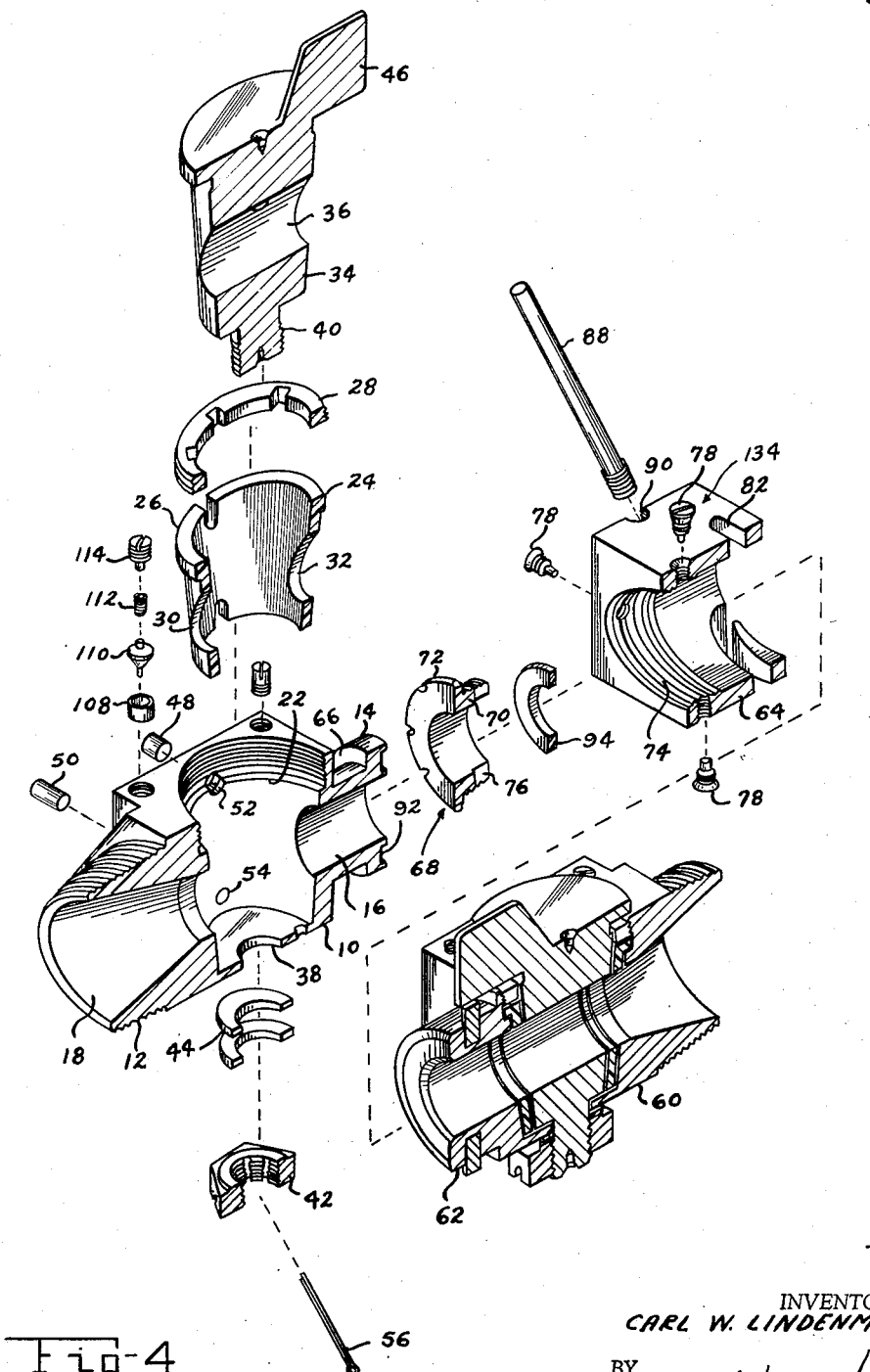
Fig. 4 is an exploded cutaway perspective of the valve and the coupling showing the construction and arrangement of the parts thereof.

In an exemplary embodiment according to the invention the valve coupling is constituted by a first valve body 10 having a suitable connector 12 adjacent the exterior end thereof for connecting to any desired conduit or the like. At the inner coupling end of the valve body 10 is a substantially cylindrical extension 14. The body 10 and the extension 14 have a longitudinal passage 16 extending therethrough and having the external end flared as at 18 to provide a smooth reducing surface to reduce the passage 16 to the communication conduit or the like. Passage 16 is substantially smooth and uniform throughout its length.

A valve cavity 20 extends transversely of the passage 16 in the body 10 and preferably is substantially frusto conical in formation. The valve cavity 20 is enlarged adjacent the open side to provide a ledge 22. A valve liner 24 is placed on the valve seating surface of the cavity 20 and has a lip 26 extending over and spaced from the shoulder 22. Retaining ring 28 is preferably threadedly engaged with the outer portion of the cavity 20 and retains the valve lining 24 under suitable compression thereon. The valve liner 24 is provided with openings 30 and 32 which match and coincide with the passage 16 to provide a substantially uniform passage. A plug valve 34 of a formation to fit closely on the seat liner 24 is provided with a valve aperture 36 of substantially uniform size with the passage 16. The body 10 is provided with an aperture 38 through which extends a valve fastener stud 40 on which is preferably a castellated nut 42 and a spring washer 44. The nut 42 and the washer 44 are adjusted to draw the valve body 34 into substantially fluid tight engagement with the liner 24. A handle 46 is provided on the plug valve 34 for rotating the aperture 36 into and out of register with the passage 16. The liner 24 is preferably constructed of such material as Teflon or Kel-F which has the property of being nonsticky or self lubricating with respect to the plug valve so that no lubrication is required to operate the valves at the pressure required to maintain fluid tightness under the conditions of temperature and pressure encountered.

In order to prevent rotation of the valve liner 24 on the seat 20 suitable anchoring plugs 48 and 50 are inserted in suitable apertures 52 and 54 in the valve body 60 and extend into recesses in the seat liner 24. While anchoring members such as the plugs 48 and 50 are preferred, obviously any suitable anchoring members such as keys and slots may be utilized. Preferably a locking member such as the cotter key 56 is provided for securing the castellated nut 42 in adjusted relation with respect to the stud 40.

A second valve body 60 is substantially identical with the valve body 10 and will not be further described.

The valve body 10 is provided with an extension 62 of substantially identical diameter with the extension 14 and is arranged for meeting in abutting relation thereto. The coupling device for the extensions 14 and 62 comprises a sleeve 64 adapted to telescopingly receive the extensions 14 and 62 and be rotatable thereon. The sleeve 64 is anchored to the extension such as 14 by means of a peripheral groove 66 on the outer surface of the extension 14 in which is placed a split nut 68. The split nut 68 is provided with a substantially cylindrical exterior portion 70 and a radially extending portion 72 which is preferably arranged for engagement with a suitable wrench device. The exteriorly threaded portion 70 is engaged with a threaded portion 74 on the interior of the sleeve 64 and a plurality of longitudinally extending apertures 76 are provided in the cylinder portion 70 for engagement with locking lugs 78. The extension 62 is provided with radially extending coupling members such as the pins 80 which are preferably at least two in number although obviously any desired number of coupling pins may be used. The sleeve 64 is provided with cam slots 82 for receiving the coupling pins 80 and upon rotation of the sleeve 64 the slots 82 will provide cam surfaces 84 for moving the abutting ends of the extensions 14 and 62 into sealing engagement with each other. Preferably the cam slot 82 has a substantially flat portion 86 so that pressure will not tend to unlock the coupling. An operating handle or handles 88 are attached to the sleeve 64 preferably by threading engagement with suitable apertures 90 therein. One of the extensions such as 14 is provided with a groove 92 in which is placed a suitable sealing ring 94 of such material as Teflon or Kel-F which is operative without lubrication and is substantially immune to the liquids being handled. In order to adjust the pressure to the sealing member 94 the locking lugs 78 may be withdrawn and the split nut 68 rotated with respect to the sleeve 64 to provide the desired tension.

In order to permit safe uncoupling of the device the plug valves are provided with longitudianlly extending grooves 100 which communicate with the passage 16 at the portion extending into the extensions 14 and 62 when the plug valves are arranged at off position. The grooves 100 communicate with the openings 102 or 102' in the bodies 10 and 60, respectively, so that when the valves are closed the fluid in the coupling can escape through the groove 100 and the openings 102 to relieve the pressure therein so that the coupling may be opened without the explosive evaporation of the material contained in the coupling. When the valves are turned to closed position the apertures 36 of the valves are filled with high pressure low temperature fluids. If the material is allowed to remain in the valves the temperature may be increased thereby seriously increasing the pressure and endangering the valve structure. To prevent this relief channels 106 and 106' are placed in the bodies 10 and 60, respectively, so that the apertures 36 will be in communication with the relief channels when the valves are in closed position thus permitting the material in the closed space of the aperture 36 to escape without endangering the valve structure. Preferably a pressure responsive valve is placed in the relief channel 106 and may comprise a valve seat 108, a poppet type valve 110, a pressure spring 112 and a pressure adjusting screw 114. Obviously this valve may be set to relieve the pressure at any desired amount. In order to control surges or other undesirable high pressures in the supply or output connections of the couplings the valves 34 are preferably provided with apertures 120 and 120' which are in communication with the exterior ends of the valve bodies when the valves are in off position and in the event a surge or extremely high pressure should occur on the exterior connection to the coupling the high pressure will communicate with the opening 120 to the interior aperture 36 and thence to the relief channel 106.

In order to properly adjust the valves at on and off position the stop member 124 and 124' is provided for engagement with shoulders 126 on the valve 34 so that when the shoulders engage with the stop members the valve aperture will be substantially exactly aligned with the passage 16. Likewise the stop member 128 is provided for engagement with a shoulder 130 on the valve 34 so that the valve aperture 36 will be in proper engagement with the relief channel 106 when the valve is in off position.

In order to prevent opening of the coupling when the valves are in on position an interlock is provided between the coupling sleeve 64 and the operating members 46 of the valves. For this purpose the sleeve 64 is provided with a substantially flat surface 134 which lies substantially in the plane of motion of the operating members 46 when the sleeve is in coupled position.

Operating members 46 and 46' extend over this flat surface when the valves are in open position and lie in proximity thereto so that the operating members 46 or 46' prevent rotation of the sleeve 64 when either of the valves is in open position.

In the operation of the valve coupling according to the invention the exterior ends of the valve bodies will be connected to any suitable device and the valves 34 turned to closed position. The adjacent ends of the extensions 14 and 62 are then substantially abutted in telescoping relation in the coupling sleeve 64. The cam slot 82 is thereby engaged with the coupling members 80 and the sleeve is rotated to locked position by means of the handles 88. If necessary, the tension at the abutting faces may be adjusted and maintained by means of the split nut 68. The valves 34 may then be opened to bring the operating members 46 into interlocking engagement with the surface 134 so that fluid may pass through the coupling in either direction. When it is desired to uncouple the device both valves will be turned to closed position at which time the grooves 100 will relieve the pressure in the coupling so that the coupling may be opened without extreme danger of a flash evaporation of the material contained in the coupling itself. Moving the valves to closed position likewise vents the interior of the valves through the relief channel 106 so that warming of the valve will not result in intense pressure therein. Likewise the opening 120 will communicate any extreme pressure in the exterior connections to the interior of the valve and consequently to the relief channel 106.

The cam action in opening the coupling provides positive action to break away any ice formation and secure release of the coupled parts.

It will thus be seen that the present invention provides a safety coupling which cannot be opened under dangerous conditions and which will successfully remove any undue pressure from the interior portions of the valve or the connections thereto.

For purposes of illustration a preferred embodiment of the invention has been shown and described according to the best present understanding thereof. However, it will be apparent to those skilled in the art that various changes and modifications in the construction and arrangements of the parts thereof may be readily resorted to without departing from the true spirit and scope of the invention.

What is claimed is:

1. A quick operating coupling for coupling a first and a second body, a first comprising substantially cylindrical extension on said first body, said first extension having a circumferential groove on its outer surface, a split nut mounted in said groove, a coupling sleeve telescopingly extending over said first extension and threadedly engaging said split nut, means for selectively locking said sleeve in relation to said nut, there being a passage through said first body and said first extension, a second extension on said second body, there being a passage through said second body and said second extension, a coupling pin secured on said second extension, said second extension telescopingly receivable in said coupling sleeve, a cam slot in said coupling sleeve adapted to cooperate with said pin to secure said first and second extension in end to abutting end relation to provide a continuous passage through said coupling.

2. A safety coupling comprising a first valve body, a first substantially cylindrical extension on said first body, there being a first passage extending through said body and said extension, said first body having a valve recess extending across said first passage, a rotatable plug valve secured in said recess for opening or closing said first passage, a coupling sleeve rotatably secured on said first extension, a second valve body, a second extension on said second valve body, said second valve body and extension having a second passage therethrough, said second valve body having a valve recess extending transverse of the passage therein, a plug valve rotatably received in said recess for opening or closing said second passage, means on said second extension for interlocking with said coupling sleeve to couple said first and second extension with said first and second passages in communicating relation, a substantially flat surface on said coupling sleeve, operating members on said plug valves, said operating members extending over said surface when said plug valves are in open position, said members cooperating with said surface to inhibit uncoupling of said coupling when either of said valves is in open position.

3. A safety valved coupling comprising a first and a second valve body, a substantially cylindrical projection on each of said valve bodies, each of said valve bodies having a substantially uniform passage extending therethrough and including said extensions, a coupling sleeve rotatably secured on one of said extensions, a coupling member on the other of said extensions, said sleeve including a cam engaging said coupling member whereby rotation of said sleeves secures said extensions in coupled relation, a rotary valve in each of said valve bodies, an operating member on each of said rotary valves, a substantially flat surface on said sleeve, said operating members extending into proximity with said flat surface when said valves are open for inhibiting rotation of said coupling sleeve when either of said valves are open.

References Cited in the file of this patent

UNITED STATES PATENTS

| | | |
|---|---|---|
| 980,624 | Gale | Jan. 3, 1911 |
| 1,350,138 | Clauss | Aug. 17, 1920 |
| 1,924,325 | Kramer | Aug. 29, 1933 |
| 2,305,841 | Carlson | Dec. 22, 1942 |
| 2,317,729 | Bruno | Apr. 27, 1943 |
| 2,660,191 | Volpin | Nov. 24, 1953 |
| 2,717,758 | Deventer | Sept. 13, 1955 |
| 2,776,104 | Sinkler | Jan. 1, 1957 |

FOREIGN PATENTS

| | | |
|---|---|---|
| 35,086 | Austria | of 1908 |